Figure 1:
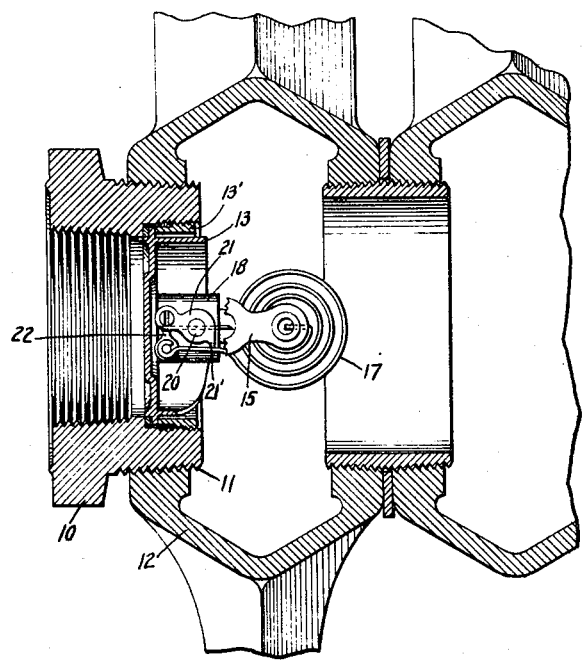

Oct. 29, 1935.     C. I. HALL     2,019,303

TEMPERATURE CONTROL DEVICE

Filed Aug. 18, 1930

Inventor:
Chester I. Hall,
by Charles E. Tullar
His Attorney.

Patented Oct. 29, 1935

2,019,303

UNITED STATES PATENT OFFICE 2,019,303

TEMPERATURE CONTROL DEVICE

Chester I. Hall, Philadelphia, Pa., assignor, by mesne assignments, to General Electric Company, a corporation of New York Application August 18, 1930, Serial No. 475,975

8 Claims. (Cl. 236—40)

My invention relates to temperature control devices more particularly thermostatically controlled valve mechanisms for controlling the flow of a heating medium to and from a heat radiating means such, for example, as hot water to and from a heating radiator.

The present invention is particularly adapted for use in connection with the heating system set forth and described in my copending application Serial No. 475,974, filed August 18, 1930 and assigned to the same assignee as the present invention.

In the heating system there described, to maintain the radiators of the heating system at the desired temperature a thermostatic valve mechanism is provided at the outlet of each radiator. This valve is open when the temperature of the water in the radiator is below a predetermined minimum. The hot water is circulated from a storage tank to the radiators, and after the hot water has filled the radiators the valve mechanism which is thermostatically controlled responds thereto to close the outlet of the radiators. This prevents further circulation through the radiator. As the temperature of the hot water decreases below a predetermined minimum the valve opens in response thereto to permit a small flow of the hot water through the radiator to maintain it at a predetermined temperature until the supply of hot water through the heating system is shut off by means of a thermostatic control. In this way each individual radiator is insured of a proper amount of heating medium at a proper temperature and the maximum heat is thus made available in each room to be heated by the radiators since flow of hot water from each individual radiator is not permitted until each charge of hot water has given up the maximum amount of useful heat. Thus cold radiators in a given hot water heating system are eliminated insuring that at all times all radiators in the system will be at a predetermined temperature.

To provide a practical thermostatic valve, it is necessary that the valve be inserted into an existing system without disturbing to any great extent the connections of the heating system since it will be very difficult and in some cases impossible to provide sufficient space between the radiator and the connecting pipes for a valve mounted without the radiator. For this reason it is necessary to provide a valve which will extend within the radiator proper and can be attached between the outlet of the radiator and the return pipe in the minimum amount of space. This makes it necessary to place the entire valve mechanism within the rapiator proper, and to pass it through the outlet opening of the radiator without contacting with the interior of the radiator proper while being placed therein. These limitations introduce difficulties which I overcome in my invention, such as making a valve readily adaptable to existing systems, requiring a minimum space exterior of the radiator for the valve mechanism and which can be inserted into the interior of the radiator without being obstructed thereby.

Hence, the principal object of the present invention is to provide an improved, efficient, and compact temperature control device in the form of a thermostatic valve mechanism for use in the outlet side of the heating radiators.

Briefly, in accordance with the invention a special bushing is inserted into the outlet side of the radiator. This bushing supports within the radiator a valve gate mechanism formed as a unit and consisting of a drum shaped member for closing the outlet of the radiator and provided with arms for supporting the thermostatic element. Extending through the drum and at one side thereof is a tubular opening in which is rotatably mounted a valve gate for closing this tubular opening. The thermostatic element is connected to the gate mechanism by means of a link structure. When the thermostatic element responds to temperature changes in the water in the radiator it causes an opening or closing of the gate mechanism to permit a flow or to stop a flow of the hot water through the radiator.

Due to its compact structure and to its peculiar design practically the entire valve mechanism with the exception of a portion of the bushing is enclosed within the radiator proper, thus requiring very little additional space and no redesign of the standard radiators. Its compact size and efficient operation make it readily adaptable to all existing hot water heating systems employing radiators.

Figure 2:
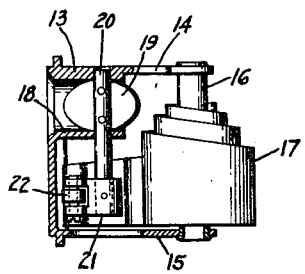

Referring to the drawing, Fig. 1 shows a cross section of a sectional radiator with the radiator valve mounted therein and Fig. 2 shows a cross section of the valve gate unit transverse to the cross section shown in Fig. 1.

In Fig. 1 the bushing 10 of the radiator valve is provided with the threaded portion 11 which engages the outlet of the sectional radiator 12. The portion provided with the threads 11 is also internally threaded for supporting the valve gate unit. This valve gate unit which closes the radiator outlet consists of a drum shaped member 13 which is supported by means of the bushing 10 and held in place by means of the threaded member 13'. This drum member which is closed except for the tubular opening 18 therethrough is provided with the arms 14 and 15 which non-rotatably support the member 16. Attached to this member 16 is a spiral thermostatic element 17. A valve gate 19 is rotatably supported in the tubular opening upon the shaft 20 and is connected to the thermostatic element by means of the lever and stop member 21 and the link mechanism 22. The stop member 21 is provided with abutment 21' to prevent rotation of the gate past full open position.

The operation of the device is as follows: With the temperature of the heating medium within the radiators 12 below a predetermined temperature the valve is in the open position as shown in Fig. 1. When the circulation of hot water fills the radiator with a charge of hot water and when this water reaches the radiator valve, the thermostatic element in response to the temperature of the hot water flowing through the radiator responds to rotate the valve gate in a counter clockwise direction to close the valve thus preventing a further flow of hot water through the particular radiator which the valve controls but without effecting the flow of hot water through any of the other radiators included in the system. The lever and stop member 21 which is provided with the abutment 21' prevents rotation of the valve gate past a fully open position with the valve gate parallel to the tubular extension as shown in Fig. 1. As radiation from the radiator occurs the valve will open slightly and permit a small flow of water to continue through the radiator maintaining it at a predetermined temperature until further circulation of hot water through the heating system is prevented by means of a room thermostat and associated equipment as shown and described in my copending application referred to above. As the temperature of the water in the radiator falls below the predetermined value the valve is again fully opened by the thermostatic element 17 to permit a new charge of hot water to be furnished to the radiator.

It will thus be seen that I have provided a unique, compact and efficient thermostatic valve readily applicable to existing heating systems which makes possible a heating system which utilizes the maximum amount of heat from the hot water circulating throughout the heating system.

The embodiment of the invention illustrated and described herein has been selected for the purpose of clearly setting forth the principles involved. It will be apparent, however, that the invention is susceptible of being modified to meet the different conditions encountered in its use, and I, therefore, aim to cover by the appended claims all of the modifications within the true spirit and scope of my invention.

What I claim as new and desire to secure by Letters Patent of the United States, is:

1. A thermostatic control device for a radiator including a threaded bushing for engaging an opening in the radiator, a thermostatic valve unit comprising a drum shaped member closed at one end and mounted in said bushing and having a tubular opening extending therethrough from said closed end at one side of said drum member, said tubular opening having a valve gate therein, a pair of oppositely disposed arms extending from the periphery of said drum member, a thermostatic element supported thereby and having its free end extending to one side of said tubular opening and connected to said gate to operate the same to close and open said tubular opening in response to the temperature of the heating medium within said radiator, said gate and thermostatic element being supported on the same side of the closed end of said drum member.

2. A thermostatic control device for a heating radiator having a threaded outlet, including a threaded bushing for engaging said outlet, said bushing having an interior portion provided with a shoulder, a device for closing said outlet and provided with a tubular opening extending through said device, means cooperating with the interior portion of said bushing for holding said device against said shoulder, said bushing supporting said device within said radiator, a valve gate rotatably mounted in said tubular opening, arms extending from said device parallel to said tubular opening and supporting a bar therebetween, a spiral thermostatic element mounted on said bar with the free end thereof at one side of said tubular opening, link connections between said valve gate and the free end of said thermostatic element to open and close said gate in response to the temperature of a heating medium within said radiator.

3. A thermostatic control device for a radiator provided with a threaded outlet including a bushing threaded to engage said outlet, said bushing having an interior internally threaded portion provided with a shoulder to detachably support a thermostatic valve gate mechanism within said radiator for closing said outlet, means cooperating with said interior portion for holding said bushing against said shoulder, said mechanism being provided with a tubular opening therethrough at one side thereof, a pair of arms extending from said mechanism within said radiator, a thermostatic element supported thereby at one side of said tubular opening, a valve gate rotatably mounted within said tubular opening, a link mechanism for connecting said valve gate to said thermostatic element whereby said thermostatic element will cause operation of said valve gate to open and close said tubular opening in response to temperature changes of a heating medium within said radiator to control the flow of the heating medium through said radiator and a stop member on said link mechanism for limiting the movement of said valve gate to a full open position.

4. In combination, a heating radiator section provided with oppositely disposed openings, one of said openings being a threaded outlet, a bushing threaded to engage said outlet and having an interior portion internally threaded and provided with a shoulder, a thermostatic valve gate mechanism supported by said bushing for closing said outlet, a member engaging said threaded portion for holding said mechanism in abutting engagement with said shoulder, said mechanism being provided with a tubular opening therethrough at one side thereof, a support on said mechanism adapted to extend within said radiator section between said oppositely disposed openings, a thermostatic element supported thereby at one side of said tubular opening, said support and thermostatic element permitting insertion through said outlet within said radiator section of said gate mechanism without obstruction from said radiator section, a valve gate rotatably mounted within said tubular opening, means connecting said valve gate and said thermostatic element to operate said valve gate to open and close said tubular opening in response to temperature changes of a heating medium within said radiator section.

5. A thermostatic control device for a heating radiator including a bushing for engaging the outlet opening in said radiator, an interior portion in said bushing internally threaded and provided with a shoulder, a drum supported by said bushing within the radiator opening and a member engaging said threaded portion for holding said drum in abutting engagement with said shoulder, said drum being provided with a tubular opening, a valve gate in said tubular opening, and a thermostatic means supported by said drum operatively connected to rotate said gate to open and close the same in response to the temperature medium within said radiator.

6. A thermostatic control device for a heating radiator including a bushing externally threaded for engaging the outlet opening in said radiator and having interior portions in said bushing of different diameters internally threaded with a shoulder therebetween, a drum supported by said bushing within the radiator opening and a member engaging one of said internally threaded portions for holding said drum in abutting engagement with said shoulder, the other internally threaded portion of said bushing being adapted to engage an outlet pipe, said drum being provided with a tubular opening therethrough, a valve gate in said opening and a thermostatic means supported by said drum operatively connected to rotate said gate to open and close the same in response to the temperature of the heating medium within said radiator.

7. A thermostatic control device for a heating radiator including a drum-shaped member having a closed end and provided with a tubular opening extending through said drum from said closed end, a valve gate rotatably mounted in said tubular opening, arms extending from said drum parallel to said tubular opening, a thermostatic element supported by said arms on the same side of the closed end of said drum-shaped member as said gate and having its free end extending to one side of said tubular opening and connected to said gate to operate the same to close and open the same in response to the temperature of the heating medium within said radiator.

8. A thermostatic control device for a heating radiator including a drum-shaped member having a closed end and provided with a tubular opening extending through said drum from said closed end, a valve gate rotatably mounted in said tubular opening, arms extending from said drum parallel to said tubular opening and supporting a bar therebetween on the same side of the closed end of said drum-shaped member as said gate, a spiral thermostatic element mounted on said bar with the free end thereof at one side of said tubular opening, link connections between said valve gate and the free end of said thermostatic element to open and close said gate in response to the temperature of a heating medium within said radiator.

CHESTER I. HALL.